(12) United States Patent
Matias et al.

(10) Patent No.: US 10,822,858 B2
(45) Date of Patent: Nov. 3, 2020

(54) POWER SUPPLY FOR MOVABLE BARRIER OPENER WITH BRUSHLESS DC MOTOR

(71) Applicant: GMI Holdings, Inc., Mt. Hope, OH (US)

(72) Inventors: Greg Matias, Copley, OH (US); Brent Buescher, Jr., Wooster, OH (US); Dan Punchak, Wadsworth, OH (US)

(73) Assignee: GMI Holdings, Inc., Mt. Hope, OH (US)

( * ) Notice: Subject to any disclaimer, the term of this patent is extended or adjusted under 35 U.S.C. 154(b) by 78 days.

(21) Appl. No.: 16/044,138

(22) Filed: Jul. 24, 2018

(65) Prior Publication Data

US 2019/0024434 A1   Jan. 24, 2019

Related U.S. Application Data (60) Provisional application No. 62/536,385, filed on Jul. 24, 2017, provisional application No. 62/536,379, filed on Jul. 24, 2017.

(51) Int. Cl.
| | |
|---|---|
| *E05F 15/668* | (2015.01) |
| *H02P 6/28* | (2016.01) |
| *H02J 7/00* | (2006.01) |
| *E05F 15/603* | (2015.01) |
| *H02J 7/14* | (2006.01) |
| *H02J 7/34* | (2006.01) |
| *H02P 31/00* | (2006.01) |

(Continued)

(52) U.S. Cl.
CPC .......... *E05F 15/668* (2015.01); *E05F 15/603* (2015.01); *H02J 7/0013* (2013.01); *H02J 7/1446* (2013.01); *H02P 6/28* (2016.02); *E05F 15/611* (2015.01); *E05F 15/632* (2015.01); *E05Y 2201/434* (2013.01); *E05Y 2400/452* (2013.01); *E05Y 2400/61* (2013.01); *E05Y 2400/612* (2013.01); *E05Y 2400/614* (2013.01); *E05Y 2900/106* (2013.01); *E05Y 2900/40* (2013.01); *H02J 7/345* (2013.01); *H02P 31/00* (2013.01)

(58) Field of Classification Search
CPC ........... E05Y 2900/40; E05Y 2900/106; E05Y 2400/612; E05Y 2400/614; E05Y 2400/61; E05F 15/63; E05F 15/603; E05F 15/668; E05F 15/70; H02J 7/0013; H02J 7/345; H02P 6/28

See application file for complete search history.

(56) References Cited

U.S. PATENT DOCUMENTS

| | | | | |
|---|---|---|---|---|
| 6,194,851 B1 * | 2/2001 | Denault | ................ | E05F 15/643 318/139 |
| 6,563,278 B2 * | 5/2003 | Roman | .................... | E05F 15/70 318/280 |

(Continued)

*Primary Examiner* — Thai T Dinh
(74) *Attorney, Agent, or Firm* — Haynes and Boone, LLP (57) ABSTRACT

A movable barrier opener system having a brushless DC motor is provided. The movable barrier opener system may have a power supply unit with a drive circuit power module and a storage bank. The storage bank may be chargeable by the drive circuit power module and may be connectable to the drive assembly to provide electrical power to the drive assembly to move the movable barrier. The drive circuit power module may be selectably turned on and off to improve efficiency of power consumption by turning off during periods of lowered demand.

12 Claims, 3 Drawing Sheets

(51) Int. Cl.
  *E05F 15/611* (2015.01)
  *E05F 15/632* (2015.01)

(56) References Cited

U.S. PATENT DOCUMENTS

| | | | | |
|---|---|---|---|---|
| 6,744,231 | B2* | 6/2004 | Fitzgibbon | E05D 15/38 |
| | | | | 318/286 |
| 6,933,843 | B1* | 8/2005 | Hom | G07C 3/00 |
| | | | | 340/545.1 |
| 7,956,718 | B2* | 6/2011 | Murphy | E05F 15/77 |
| | | | | 340/3.1 |
| 7,972,027 | B1 | 7/2011 | Hatfield | |
| 8,314,509 | B2* | 11/2012 | Fitzgibbon | E05F 15/603 |
| | | | | 307/11 |
| 8,542,093 | B2* | 9/2013 | Rodriguez | G05B 19/042 |
| | | | | 340/5.51 |
| 10,557,300 | B2* | 2/2020 | Tagtow | E05F 15/77 |
| 2004/0164693 | A1* | 8/2004 | Murray | E05F 15/43 |
| | | | | 318/286 |
| 2006/0202815 | A1 | 9/2006 | John | |
| 2009/0122534 | A1 | 5/2009 | Olmsted | |
| 2010/0027293 | A1 | 2/2010 | Li | |
| 2010/0115853 | A1* | 5/2010 | Gebhart | H02P 6/085 |
| | | | | 49/506 |
| 2012/0194138 | A1* | 8/2012 | Uno | H01M 10/44 |
| | | | | 320/119 |
| 2013/0285584 | A1* | 10/2013 | Kim | H02P 29/0241 |
| | | | | 318/400.21 |
| 2014/0085624 | A1 | 3/2014 | Wilfinger et al. | |
| 2014/0085924 | A1 | 3/2014 | Li et al. | |
| 2017/0052585 | A1* | 2/2017 | Podolefsky | H01M 10/625 |

* cited by examiner

POWER SUPPLY FOR MOVABLE BARRIER OPENER WITH BRUSHLESS DC MOTOR

RELATED APPLICATION

This application claims the benefit of and priority from U.S. Provisional Patent Application Ser. No. 62/536,385 entitled "BRUSHLESS DC MOTOR OPERATOR," filed Jul. 24, 2017, and naming Greg Matias and Dan Punchack as inventors and U.S. Provisional Patent Application Ser. No. 62/536,379 entitled "BRUSHLESS DC MOTOR OPERATOR," filed Jul. 24, 2017, and naming Greg Matias and Brent Buescher, Jr. as inventors, each of which is incorporated in its entirety by reference herein for all purposes.

TECHNICAL FIELD

The present invention relates generally to movable barrier opener systems for opening and closing garage doors, gates, and other movable barriers, in particular to movable barrier opener systems incorporating brushless motors, and even more particularly to a new and improved power supply for such system.

BACKGROUND

Upward acting sectional or single panel garage doors, rollup doors, gates, and other types of powered movable barriers utilize movable barrier opener systems for facilitating control over the movement of the barriers. A typical movable barrier opener system comprises a movable barrier operator and a drive assembly, including a motor, for imparting movement to the movable barrier (e.g., the garage door). The movable barrier operator includes a controller which, typically, constitutes a programmable platform such as a microprocessor, microcontroller, or the like, that is preprogrammed with the appropriate instructions and data for carrying out the desired processing. The operation of most existing movable barrier opening systems is typically responsive to only externally transmitted command signals from user-actuation of (i) interior or exterior building mounted consoles, in wired or wireless communication with the movable barrier operator, (ii) hand held or vehicle mounted wireless transmitters, and/or (iii) remotely disposed network (e.g., Internet) access devices (e.g., Smartphones).

A movable barrier opener system typically incorporates a power supply for powering the controller and the drive assembly, including the motor. Because the motor is required to open, close, and otherwise move the movable barrier, the motor requires significant electrical power, particularly when initially initiating the movement of the barrier and/or changing the direction of barrier movement. Thus, the power supply components may frequently be sized to handle the maximum instantaneous current requirement of the movable barrier opener system. For such a movable barrier opener system, the drive motor consumes a significant portion of the total power supply load.

Various approaches to meeting the electrical power needs of a movable barrier opener system include providing a relatively high capacity power supply system. However, the relatively large electrical power need of the system occurs intermittently during movement of the movable barrier by a motor of the system. Due to the intermittent duty cycle of the relatively large electrical power need of the system, the large electrical power capacity is often unnecessary during much time, and in particular, during the significant rest time during which the movable barrier is not being moved by the motor. The quiescent power consumption of the power supply is during this idle time contribute to waste of electricity. Moreover, larger power supplies with a larger electrical power capacity, such as those to provide the relatively large electrical power need of the system during movement periods, often consume larger amounts of quiescent power during idle periods. There is often inefficient consumption of power during the idle time between movements of the movable barrier. It is therefore a principal object of this invention to provide a new and improved power supply for a movable barrier opener system incorporating a brushless motor.

SUMMARY

A movable barrier opener system is provided. The system may include a drive assembly to move a movable barrier. The drive assembly may include a brushless motor connectable to the movable barrier to move the movable barrier. The system may include a power supply unit with a controller power module configured to provide electrical power to the controller and a drive circuit power module configured to provide power to aspects of the drive assembly. A storage bank may be connectable to the drive assembly and the drive circuit power module and the storage bank configured to provide electrical power to the drive assembly to move the movable barrier. The drive circuit power module may be deactivated during periods of non-use, for instance, when the brushless motor is not operating and/or when the storage bank is not charging.

A method of drive circuit power module augmentation for a movable barrier opener system including a drive assembly having a multiphase brushless motor is provided. The method may include determining whether a drive assembly is in an idle state or an operating state. In response to determining that the drive assembly state is the operating state, the method may include, directing, by the controller, the drive circuit power module to connect a storage bank to the drive assembly to provide electrical power to the brushless motor and/or directing the drive circuit power module to supply electrical power to the storage bank and/or brushless motor. The method may include, in response to determining that the drive assembly state is in the idle state, directing, by the controller, the drive circuit power module to at least one of deactivate and/or connect the storage bank to the drive circuit power module to receive electrical power for storage.

A non-transient computer readable medium is provided. The non-transient computer readable medium may contain program instructions for causing a movable barrier opener system to perform a method of drive circuit power module augmentation.

BRIEF DESCRIPTION OF THE DRAWINGS

Alt embodiments of the new and improved apparatus and methods of the present invention, as well as more features and details thereof will become readily understood from a review of the following detailed description, taken in connection with the appended drawings, in which.

DETAILED DESCRIPTION

A movable barrier opener system to move a sectional, one-piece or rolling type door between the open and closed position is provided. In various instances, the movable barrier opener system may incorporate at least a power supply system, a drive assembly with a multiphase brushless motor and a multiphase drive circuit that drives the multiphase brushless motor, a barrier operator, and a movable barrier assembly. The multiphase brushless motor consumes significantly more power than the controller, particularly when first beginning motion. As such, a significant, or a most significant portion of a total load on a power supply system of a movable barrier opener system having a multiphase brushless motor is the multiphase drive circuit and the multiphase brushless motor.

To address these concerns, and as disclosed herein, in various embodiments, the power supply of the barrier operator and the power supply of the drive assembly are separated and the power supply of the drive assembly may be deactivated (e.g., set to refrain from outputting electrical energy) during times that the drive assembly is not operating (e.g., a movable barrier is not being moved). Alternatively, or in addition to this separation aspect, a storage bank may also be implemented. The storage bank may augment capacity of the power supply to meet loads during periods of relatively large electrical power need. Consequently, it is no longer necessary to size a power supply to meet the relatively large electrical power need that occurs only intermittently during movement of the movable barrier by the multiphase brushless motor.

Therefore, more efficient power supplies may be implemented. For instance, if X % of power consumed by a power supply is due to thermal dissipation, waste, quiescent current, etc., then all things equal, a power supply with a smaller power capacity will exhibit a smaller amount of power associated with the X %. Furthermore, cost savings are realized, as smaller and less expensive components may be selected while still meeting the operational needs of the multiphase brushless motor.

Moreover, the storage bank may provide sufficient electrical power that the power supply is not required to be providing power to the multiphase brushless motor and the multiphase drive circuit while the multiphase brushless motor is operating. Thus, at least a portion of the power supply is deactivated from time to time. For instance, a portion of the power supply associated with charging the storage bank and/or powering the multiphase brushless motor and the multiphase drive circuit may be deactivated during idle times. This portion of the power supply may also be deactivated during the actual movement of the multiphase brushless motor. Such a power supply may be periodically activated to restore charge to the storage bank when it becomes depleted. In this manner, the peak electrical power need is diminished and the total power supplied is spread over time, again permitting smaller and less expensive components to be selected while still meeting the operational needs of the multiphase brushless motor.

Figure 1:
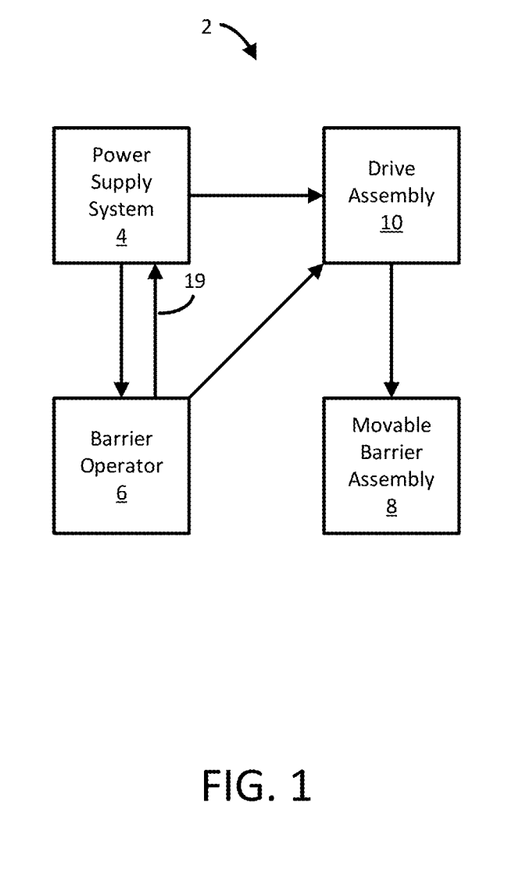
FIG. 1 is a functional block diagram of movable barrier opener system adapted for incorporation of the new and improved method and apparatus of the present invention.
Figure 2:
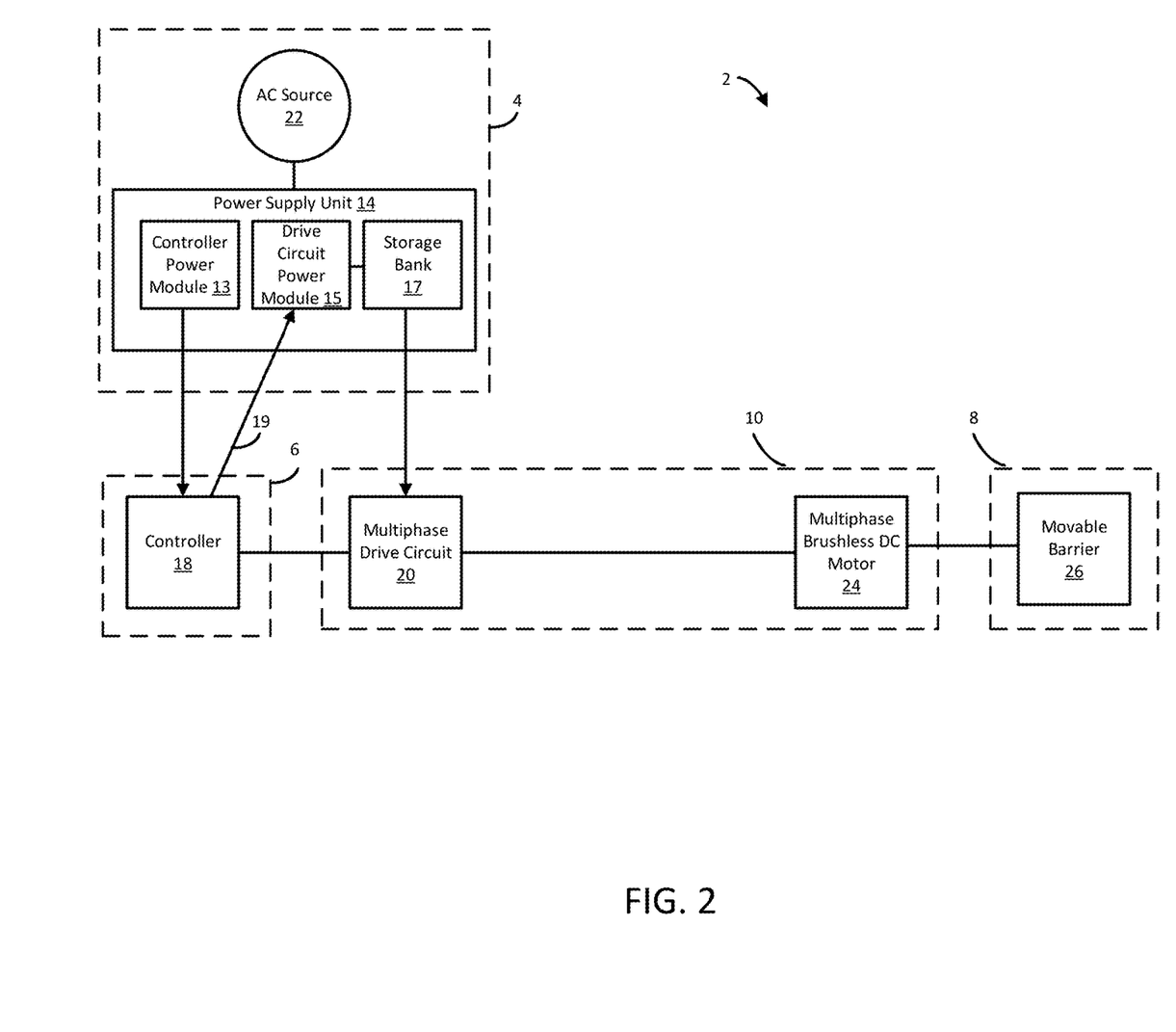
FIG. 2 is a more detailed block diagram view of the movable barrier opener system of FIG. 1, illustrating the incorporation of a drive circuit power module, according to various embodiments.

With reference to FIGS. 1 and 2, a movable barrier opener system 2 may comprise a power supply system 4 configured to provide electrical power to a drive assembly 10 and a barrier operator 6. A drive assembly 10 is provided to move aspects of a movable barrier assembly 8 between positions, such as an open position and a closed position, thereby moving the movable barrier 26 of the movable barrier assembly 8 to selectably emplace the movable barrier 26. The barrier operator 6 is provided to control operation of the drive assembly 10 and thus control moving the movable barrier 26 of the movable barrier assembly 8 according to methods such as those disclosed herein.

Turning specific attention to FIG. 2, a power supply system 4 may include an AC source 22 that, for example, comprises an electrical connection to a line current source, such as an electrical plug and/or other interface configured to receive electrical power from an electrical power distribution grid by way of electrical sockets or the like.

The power supply system 4 may comprise a power supply unit 14. The power supply unit 14 may comprise a plurality of power supplies configured to receive AC power from an AC source 22 and configured to adjust the AC power and rectify the AC power to DC power. The power supply unit 14 is configured to produce electrical power suitable for operating a barrier operator 6, including the controller 18, and to produce electrical power suitable for operating a drive assembly 10, including multiphase drive circuit 20 and multiphase brushless motor 24.

While the power supply system 4 will be discussed in specific detail later herein, an initial discussion of the specific aspects of the barrier operator 6, the drive assembly 10, and the movable barrier assembly 8 will provide helpful context. Thus, a discussion of these further aspects will proceed in advance of a detailed and specific discussion of the power supply system 4 introduced above.

A barrier operator 6 may include various components. For instance, a barrier operator 6 may include a controller 18, a suitably programmed computer platform, such as a preprogrammed microcontroller, microprocessor, or like apparatus. The controller 18 is operatively coupled, and programmed to provide barrier movement instructions to appropriate drive circuitry, specifically multiphase drive circuit 20 of the drive assembly 10 in order to drive a multiphase brushless motor 24. In this manner, the controller 18 of the barrier operator 6 is operatively coupled to the drive assembly 10 and configured to control the drive assembly 10.

The drive assembly 10 may also include various components. For instance, the drive assembly 10 may include a multiphase drive circuit 20. The multiphase drive circuit 20 comprises a circuit configured to receive instructions from the controller 18 regarding movement of a movable barrier 26 and generate winding drive currents having waveforms tailored to generate particular behavior from the multiphase brushless motor 24 corresponding to the desired movement of a movable barrier 26 connected to the multiphase brushless motor 24.

The drive assembly 10 may include the aforementioned multiphase brushless motor 24. The multiphase brushless motor 24 is a direct-current (DC) type. The multiphase brushless motor 24 may have windings. While the brushless motor may have three sets of windings, other numbers of sets of windings may also be implemented. The brushless motor may be driven such that separate driving waveforms associated with each separate winding collaborate to cause the motor to rotate with a torque, direction, velocity, acceleration, and/or other characteristic as desired and under control of the controller 18.

A movable barrier assembly 8 may include various components. For instance, the movable barrier assembly 8 includes a movable barrier 26 that is movable in response to the drive assembly 10. The movable barrier 26 may be a garage door, gate, or any of the different types of powered movable barriers.

Returning focus now to the power supply system 4, a detailed discussion of aspects of the power supply system 4 follows below. For example, a power supply system 4 may include the mentioned power supply unit 14. The power supply unit 14 may produce electrical power suitable for operating a barrier operator 6 via a controller power module 13 and may produce electrical power suitable for operating a drive assembly 10.

Thus, the power supply unit 14 may comprise a controller power module 13. A controller power module 13 receives power from an AC source 22 and at least one of changes the voltage, rectifies, and/or otherwise conditions the power from the AC source 22 to conform to specifications of the controller 18.

The power supply unit 14 may also include a drive circuit power module 15. The drive circuit power module 15 receive power from an AC source 22 and at least one of change the voltage, rectifies, and/or otherwise condition the power from the AC source 22 to conform to the specifications of the drive assembly 10, and specifically, the multiphase drive circuit 20 and the multiphase brushless motor 24. In various instances, the drive circuit power module 15 is sized to support the idle/quiescent power consumption of the drive assembly 10 (and/or a charging power consumption of a storage bank 17 also connected to the drive circuit power module 15 and discussed below). However, the drive circuit power module 15 may be sized smaller than would support the instantaneous peak power consumption specifications of the drive assembly 10.

In various embodiments, the power supply unit 14 also includes a storage bank 17 connected between the drive circuit power module 15 and the multiphase drive circuit 20. While the storage bank is depicted in FIG. 2 in connection with the drive circuit power module 15, further example embodiments omit the storage bank 17, and improve operation of the power supply unit 14 by deactivating separately from the controller power module 13 during times of non-movement of the drive assembly 10.

The storage bank 17 is connected between the drive circuit power module 15 and the drive assembly 10, for instance between the drive circuit power module 15 and the multiphase drive circuit 20. In various instances, the storage bank 17 comprises at least one capacitor. In further instances, the storage bank 17 comprises at least one battery. In still further instances, the storage bank 17 comprises a plurality of capacitors. In yet further instances, the storage bank 17 comprises a plurality of batteries. In still additional instances, the storage bank 17 comprises a combination of one or more capacitor and one or more battery. Thus, the storage bank 17 may comprise one or more charge storage device of one or more type. In this manner, the storage bank 17 may store a reserve of electrical power so that during times that the drive assembly 10 demands an instantaneous peak power, the storage bank 17 and/or a combination of the storage bank 17 and the drive circuit power module 15 provide the requisite electrical power.

In various embodiments, the storage bank 17 comprises a plurality of charge storage devices (e.g., capacitors and/or batteries), as mentioned. Also notable is that the plurality of charge storage devices may be reconfigurable. For instance, the storage bank 17 may be configured by the drive circuit power module 15 to arrange the charge storage devices in parallel at times and in series at times.

For instance, the drive circuit power module 15 may arrange the charge storage devices in parallel for charging by the drive circuit power module 15 and then in series for to provide power to the multiphase drive circuit 20 having a higher voltage than that associated with the output of the drive circuit power module 15. In further instances, the drive circuit power module 15 may arrange the charge storage devices in series for charging by the drive circuit power module 15 and then in parallel to provide power to the multiphase drive circuit 20 having a higher available current than that associated with the output of the drive circuit power module 15 and than that associated with an individual charge storage device. In further instances, the drive circuit power module 15 arranges the charge storage devices in parallel for charging by the drive circuit power module 15 such that the charge storage devices charge to a voltage equivalent to that of the output of the drive circuit power module 15, and also arranges the charge storage devices in parallel for providing power to the multiphase drive circuit 20, the power also having a higher available current than that associated with the output of the drive circuit power module 15.

The drive circuit power module 15 is further interconnected to the barrier operator 6 by a communication pathway. Specifically, the drive circuit power module 15 is connected to the controller 18 of the barrier operator 6 by a drive circuit power module control channel 19. The drive circuit power module control channel 19 comprises an operative electronic connection whereby signals may be passed between the controller 18 and the drive circuit power module 15.

By utilizing the drive circuit power module control channel 19, the controller 18 may direct the drive circuit power module 15 to shut down and/or power up at different times, facilitating further power savings over time. In general, the controller 18 directs the drive circuit power module 15 to shut down during times of lowered demand and start up during times of elevated demand.

A time of lowered demand may include wherein the storage bank 17 is charged at or near capacity and/or the drive assembly 10 demands less than the instantaneous peak power and/or less than the quiescent power consumption. A time of elevated demand may include wherein the storage bank 17 is only charged to less than capacity and/or the drive assembly 10 demands more than the quiescent power consumption and/or demands an instantaneous peak power.

In embodiments omitting the storage bank 17, a time of lowered demand may include wherein the drive assembly 10 is not operating such that the multiphase brushless motor 24 and the multiphase drive circuit 20 are not moving a movable barrier 26. A time of elevated demand may include wherein the drive assembly 10 is operating such that the multiphase brushless motor 24 and the multiphase drive circuit 20 are moving, or imminently will begin moving, the movable barrier 26.

Thus, regardless of whether a storage bank 17 is implemented, during times that the movable barrier 26 is not moving under the influence of the multiphase brushless motor 24 of the drive assembly 10, the drive circuit power module 15 may deactivate, improving operating efficiency by reducing power consumption. More specifically, the following scenarios of lowered demand and raised demand are contemplated.

The controller 18 may direct the drive circuit power module 15 via a signal transmitted over the drive circuit power module control channel 19 to shut down and stop producing power when the drive assembly 10 is not demanding power, such as when the multiphase brushless motor 24 and the multiphase drive circuit 20 are idle ("Non-Movement—Lowered Demand State").

The controller 18 may direct the drive circuit power module 15 via a signal transmitted over the drive circuit power module control channel 19 to shut down and stop producing power when the drive assembly 10 is demanding power but the power is fully supplied by the storage bank 17 ("Storage Bank Supplies Drive Assembly—Lowered Demand State").

The controller 18 may direct the drive circuit power module 15 via a signal transmitted over the drive circuit power module control channel 19 to begin producing power when the drive assembly 10 is demanding power and the storage bank 17 is not fully supplying the demanded power, such as when the multiphase brushless motor 24 and the multiphase drive circuit 20 are operating and the storage bank 17 is not fully supplying their power needs ("Power Supply Supplies Drive Assembly—Elevated Demand State").

The controller 18 also may direct the drive circuit power module 15 via a signal transmitted over the drive circuit power module control channel 19 to begin producing power when the storage bank 17 is not fully charged, so that the storage bank 17 may recharge ("Power Supply Supplies Storage Bank—Elevated Demand State").

Finally, the controller 18 also may direct the drive circuit power module 15 via a signal transmitted over the drive circuit power module control channel 19 to shut down and stop producing power when the storage bank 17 reaches a fully charged state ("Storage Bank at Capacity—Lowered Demand State").

One may appreciate that the aforementioned states may occur simultaneously. Moreover, one may appreciate that during a time of simultaneous occurrence of so called lower demand states and elevated demand state, the elevated demand state may supersede the lowered demand state such that the controller 18 directs the drive circuit power module 15 via the signal transmitted over the drive circuit power module control channel 19 to begin producing power.

Figure 3:
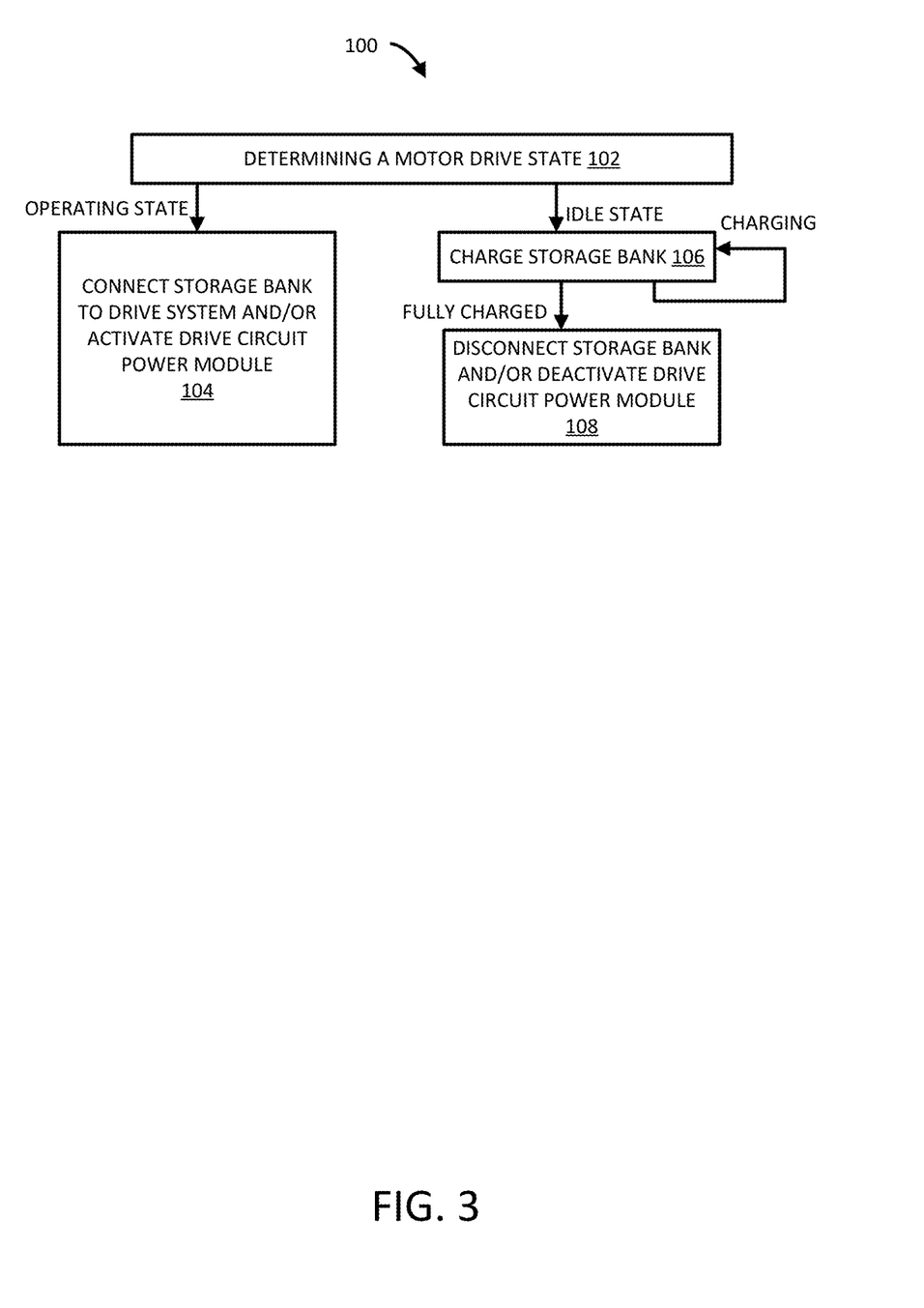
FIG. 3 depicts a flowchart of a drive circuit power module augmentation method implementable with the movable barrier opener system illustrated in FIG. 2.

Having concluded the discussion of the movable barrier opener system 2 and related components, attention is directed to FIG. 3, in addition to FIGS. 1 and 2, for a discussion of a method 100 of drive circuit power module augmentation. For instance, a method 100 of drive circuit power module augmentation may include determining by a controller 18 in connection to a drive circuit power module 15 of a power supply unit 14 of a power supply system 4, whether a drive assembly 10 (and specifically, a multiphase drive circuit 20 driving a multiphase brushless motor 24) is in an idle state or whether the drive assembly 10 is in an operating state. An idle state may include wherein a movable barrier 26 of a movable barrier assembly 8 connected to the drive assembly 10 is not moving and an instruction to begin movement has not been received by the controller 18. An operating state may include wherein a movable barrier 26 of a movable barrier assembly 8 connected to a drive assembly 10 is not yet moving, but an instruction to begin movement has been received by the controller 18. Furthermore, an operating state may include wherein a movable barrier 26 is moving. Thus one may say that the method 100 includes determining a motor drive state (block 102).

In response to determining by the controller 18 that a motor drive state is an operating state, the controller 18 may use the storage bank 17 to provide electrical power to the drive assembly 10. The controller 18 may direct the drive circuit power module 15 to connect the storage bank 17 to the drive assembly 10 to provide electrical power to the drive assembly 10 (block 104). In response to determining that a motor drive state is in an idle state, the controller 18 may cause the drive circuit power module 15 to charge the storage bank 17. The controller 18 may direct the drive circuit power module 15 to connect the storage bank 17 to the drive circuit power module 15 to receive electrical power for storage (block 106).

Furthermore, in response to determining by the controller 18 that a motor drive state is in an idle state and also that the storage bank 17 has a threshold charge level associated with a full charge of the charge storage devices of the storage bank 17, the controller 18 may direct the drive circuit power module 15 to disconnect from the storage bank 17 to cease to provide electrical power to the storage bank 17 (e.g., to enter a "power saving mode") (block 108).

A power savings mode may include a maintenance charging mode such as trickle charging, or a float charging, or periodic charging wherein the drive circuit power module 15 periodically connects the storage bank 17 to the drive circuit power module 15 and/or periodically activates the drive circuit power module 15 to provide electrical power to the storage bank 17 to charge it (e.g., to enter a "maintenance charging mode") but otherwise disconnects the storage bank 17 from the drive circuit power module 15 and/or deactivates the drive circuit power module 15.

Furthermore, in response to determining that a motor drive state is in an idle state, and also that the storage bank 17 has fallen below a floor charge level associated with a discharged state of the charge storage devices of the storage bank 17, the controller 18 may direct the drive circuit power module 15 to provide electrical power to the storage bank 17 to charge it (e.g., to enter a "recharging mode").

Thus one may appreciate that various aspects of the movable barrier opener system 2 interoperate to effectuate a method 100 as discussed above. However, one will appreciate that while certain aspects of the method are discussed in sequence, in various embodiments, aspects of the method may occur in parallel. In addition, aspects of the method may occur in different sequences.

Moreover, while the present disclosure has been described in the context of a limited number of embodiments, those skilled in the art, having benefit of this disclosure, will appreciate that other embodiments can be envisioned that also embody the new and improved process and apparatus of the present invention.

The invention claimed is:

1. A movable barrier opener system comprising:
   a drive assembly to move a movable barrier, the drive assembly comprising a multiphase brushless motor connectable to the movable barrier to move the movable barrier;
   a barrier operator connected to the drive assembly and comprising a controller configured to instruct the drive assembly to move the movable barrier; and
   a power supply unit comprising:
      a controller power module configured to provide electrical power to the controller;
      a drive circuit power module configured to charge a storage bank; and
      the storage bank connectable to the drive assembly to provide electrical power to the drive assembly to move the movable barrier responsive to the instructions from the controller,
   wherein the storage bank connects to the drive circuit power module for charging and connects to the drive assembly to provide power to the drive assembly for moving the movable barrier, and wherein the controller turns on the drive circuit power module in response to directing the drive assembly to move the movable barrier and turns off the drive circuit power module in response to directing the drive assembly to cease moving of the movable barrier.

2. A movable barrier opener system comprising:
a drive assembly to move a movable barrier, the drive assembly comprising a multiphase brushless motor connectable to the movable barrier to move the movable barrier;
a barrier operator connected to the drive assembly and comprising a controller configured to instruct the drive assembly to move the movable barrier and;
a power supply unit comprising:
a controller power module configured to provide electrical power to the controller;
a drive circuit power module configured to charge a storage bank; and
the storage bank connectable to the drive assembly to provide electrical power to the drive assembly to move the movable barrier responsive to the instructions from the controller;
wherein the storage bank connects to the drive circuit power module for charging and connects to the drive assembly to provide power to the drive assembly for moving the movable barrier,
wherein the controller turns on the drive circuit power module in response to directing the drive circuit power module to charge the storage bank and turns off the drive circuit power module in response to the storage bank reaching a threshold charge level associated with a full charge, and
wherein the controller turns on the drive circuit power module periodically in response to the controller directing the drive circuit power module to charge the storage bank periodically in a maintenance charge mode.

3. A method of drive circuit power module augmentation for a movable barrier opener system comprising a drive assembly having a multiphase brushless motor, the method comprising:
determining, by a controller in connection to a drive circuit power module of a power supply unit, a drive assembly state comprising whether the drive assembly is in an idle state or an operating state;
in response to determining that the drive assembly state is the operating state, directing, by the controller, the drive circuit power module to connect a storage bank to the drive assembly to provide electrical power to the drive assembly; and
in response to determining that the drive assembly state is the idle state, directing, by the controller, the drive circuit power module to at least one of (i) deactivate and (ii) connect the storage bank to the drive circuit power module to receive electrical power for storage.

4. The method of drive circuit power module augmentation according to claim 3, wherein the idle state comprises wherein a movable barrier of a movable barrier assembly connected to the drive assembly is not moving and an instruction to begin movement has not been received by the controller from a user.

5. The method of drive circuit power module augmentation according to claim 3, wherein the operating state comprises at least one of wherein an instruction to begin movement has been received by the controller from a user and wherein the multiphase brushless motor is moving a movable barrier.

6. The method of drive circuit power module augmentation according to claim 3, further comprising:
in response to determining that the drive assembly state is in the idle state and the storage bank has reached a threshold charge level associated with a full charge, directing, by the controller, the drive circuit power module to cease to provide electrical power to the storage bank.

7. The method of drive circuit power module augmentation according to claim 3, further comprising:
in response to determining that the drive assembly state is in the idle state and the storage bank has fallen below a floor charge level associated with a discharged state, directing, by the controller, the drive circuit power module to connect the storage bank to the drive circuit power module to receive electrical power for storage.

8. The method of drive circuit power module augmentation according to claim 3, wherein the multiphase brushless motor is connectable to a movable barrier to move the movable barrier.

9. The method of drive circuit power module augmentation according to claim 3, wherein the power supply unit further comprises a controller power module configured to provide electrical power to the controller.

10. The method of drive circuit power module augmentation according to claim 3, wherein the storage bank comprises at least one capacitor.

11. The method of drive circuit power module augmentation according to claim 3, wherein the storage bank comprises at least one battery.

12. A non-transient computer readable medium containing program instructions for causing a movable barrier opener system comprising a drive assembly having a multiphase brushless motor to perform a method of drive circuit power module augmentation, the method comprising:
determining, by a controller in connection to a drive circuit power module of a power supply unit, a drive assembly state comprising whether the drive assembly is in an idle state or an operating state;
in response to determining that the drive assembly state is the operating state, directing, by the controller, the drive circuit power module to connect a storage bank to the drive assembly to provide electrical power to the drive assembly; and
in response to determining that the drive assembly state is in the idle state, directing, by the controller, the drive circuit power module to at least one of (i) deactivate and (ii) connect the storage bank to the drive circuit power module to receive electrical power for storage.

* * * * *

UNITED STATES PATENT AND TRADEMARK OFFICE
CERTIFICATE OF CORRECTION

PATENT NO. : 10,822,858 B2
APPLICATION NO. : 16/044138
DATED : November 3, 2020
INVENTOR(S) : Greg Matias et al.

Page 1 of 1

It is certified that error appears in the above-identified patent and that said Letters Patent is hereby corrected as shown below:

In the Specification

Column 1, Line 9, change "Punchack" to -- Punchak --

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*